United States Patent [19]

Arnold

[11] Patent Number: 4,989,809
[45] Date of Patent: Feb. 5, 1991

[54] REMOVABLE AIRCRAFT FLOOR STRUCTURE-REINFORCING STRONGBACK

[75] Inventor: Alison M. Arnold, Island County, Wash.

[73] Assignee: The Boeing Company, Seattle, Wash.

[21] Appl. No.: 427,978

[22] Filed: Oct. 25, 1989

Related U.S. Application Data

[63] Continuation of Ser. No. 167,349, Mar. 14, 1988, abandoned.

[51] Int. Cl.⁵ .............................................. B64D 9/00
[52] U.S. Cl. ................................ 244/137.1; 244/118.1
[58] Field of Search ............... 244/118.1, 118.2, 137.1, 244/119

[56] References Cited

U.S. PATENT DOCUMENTS

| | | | |
|---|---|---|---|
| 2,415,975 | 2/1947 | Thomson | 244/118.1 |
| 2,858,774 | 11/1958 | Batten | 244/137.1 |
| 3,142,461 | 7/1964 | Naylor | 244/137.1 |
| 3,262,588 | 7/1966 | Davidson | 244/137.1 |
| 3,381,921 | 5/1968 | McDonough et al. | 244/137.1 |
| 3,480,239 | 11/1969 | Jensen et al. | 244/118.1 |
| 3,612,316 | 10/1971 | Baldwin | 244/137.1 |
| 3,694,990 | 10/1972 | Pamer | 52/731 |
| 3,741,504 | 6/1973 | Alberti et al. | 244/118.1 |
| 3,820,747 | 6/1974 | Bateson et al. | 244/118.1 |
| 4,000,870 | 1/1977 | Davies | 244/137.1 |
| 4,066,227 | 1/1978 | Buchsel | 244/118.6 |
| 4,077,590 | 3/1978 | Shorey | 244/137.1 |
| 4,234,278 | 11/1980 | Iiarshmann et al. | 244/118.1 |
| 4,388,030 | 6/1983 | Skaale | 244/118.1 |
| 4,416,097 | 11/1983 | Weir | 52/731 |
| 4,426,051 | 1/1984 | Banks et al. | 244/137.3 |
| 4,509,888 | 4/1985 | Sheek | 244/118.1 |

FOREIGN PATENT DOCUMENTS 566915 4/1958 Belgium .
2096232 9/1982 United Kingdom .

*Primary Examiner*—Joseph F. Peters, Jr.
*Assistant Examiner*—Anne E. Bidwell
*Attorney, Agent, or Firm*—Seed and Berry

[57] ABSTRACT

A removable aircraft floor structure-reinforcing strongback is removably attachable to seat tracks in a conventional civilian cargo aircraft to increase the floor structure load rating thereof. The strongback does not require any permanent modifications to the aircraft fuselage and preferably engages seat tracks in the aircraft floor structure.

The strongback comprises a removable beam extending longitudinally over a significant distance of the aircraft center line. The strongback re-distributes local loads from one section of the aircraft floor structure to a plurality of transverse floor beams underneath the strongback. In this manner, the axle load rating of the aircraft floor is increased for supporting military vehicles.

16 Claims, 3 Drawing Sheets

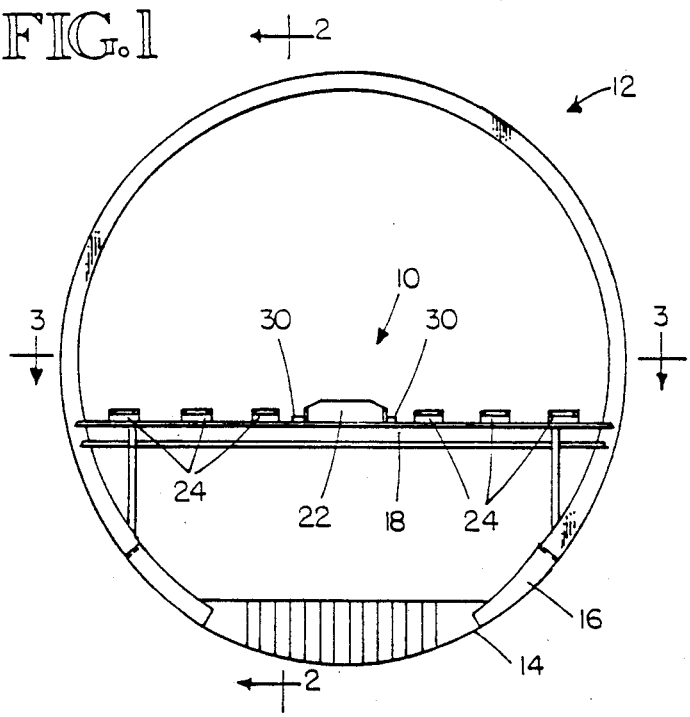
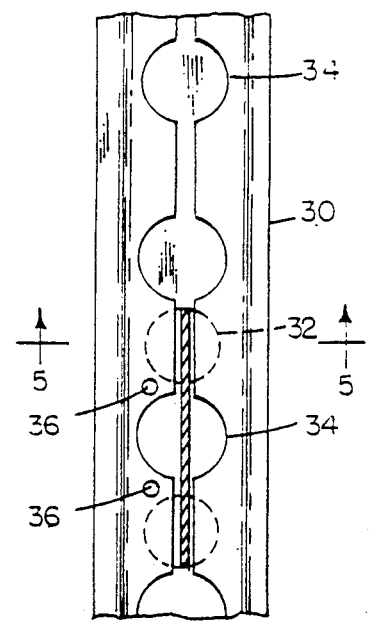
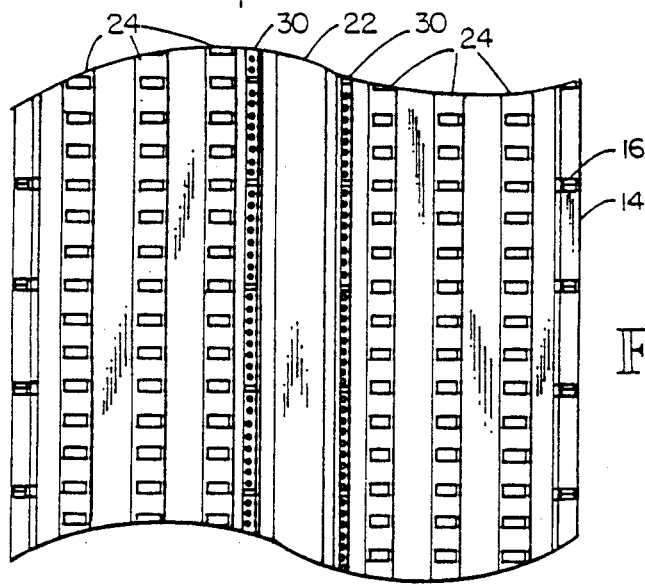
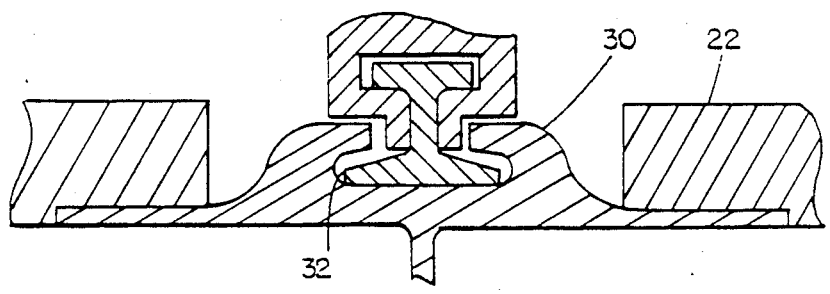

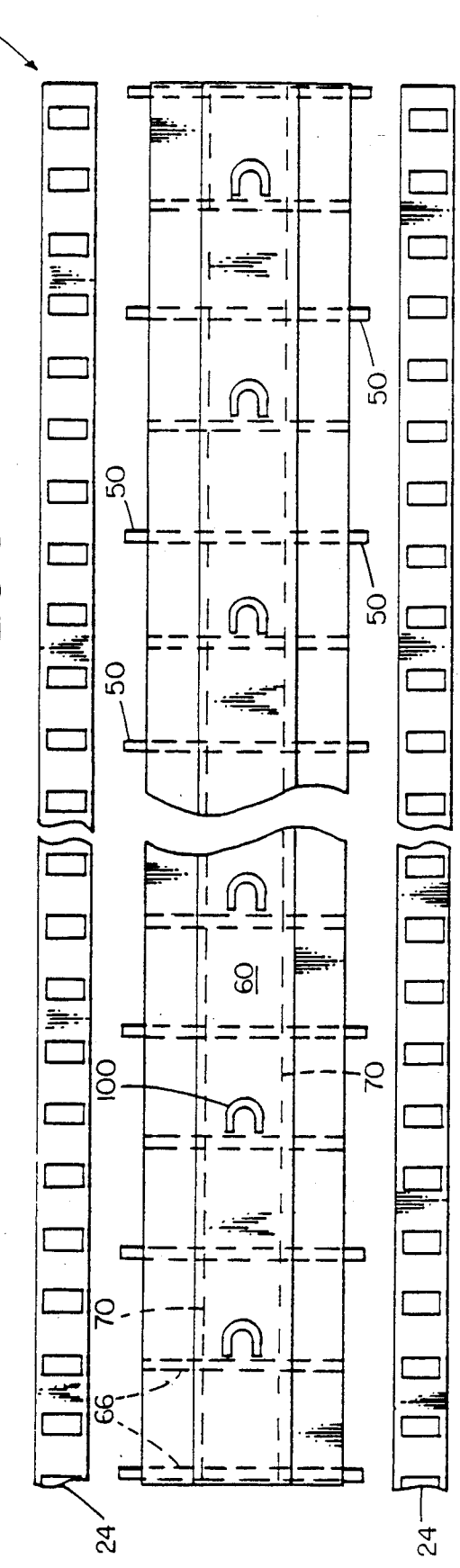
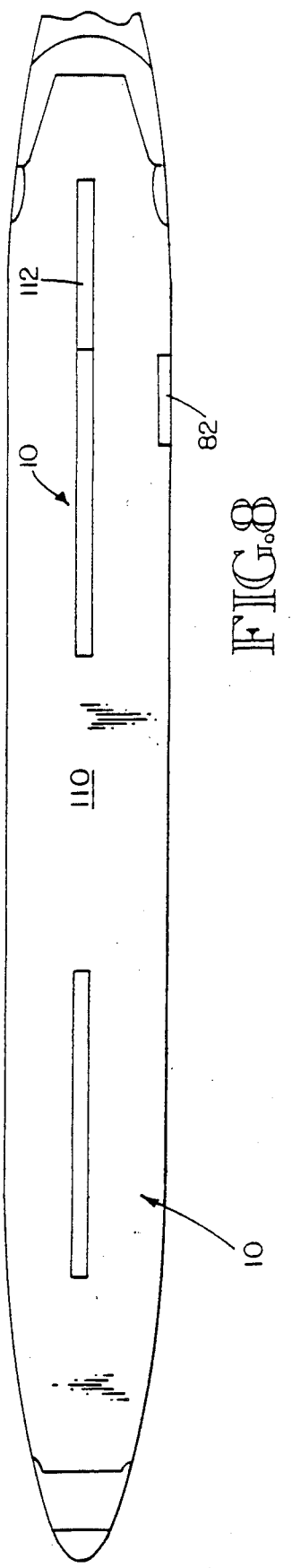

REMOVABLE AIRCRAFT FLOOR STRUCTURE-REINFORCING STRONGBACK

CROSS-REFERENCE TO RELATED APPLICATION

This application is a continuation of U.S. patent application Ser. No. 07/167,349 filed 03/14/88, now abandoned.

TECHNICAL FIELD

The invention relates to removable structures for aircraft. Specifically, the invention relates to temporary structural enhancements of cargo aircraft.

BACKGROUND ART

Aircraft are typically optimized in design for an intended purpose. In particular, commercial airliners, such as the Boeing 747, are specifically designed for carrying either passengers or cargo in their primary mode. Also, the passenger and cargo models utilize a large commonality of structural features to make manufacture economical. Specifically, the freighter version has seat track installations that are interchangeable with those of the passenger version, at manufacture, even though a freighter is not designed primarily for seat installation and passenger carriage. However, these tracks are useful for accommodating the attachment of freighter cargo-handling components. Furthermore, there are available passenger/cargo and convertible models of 747 aircraft.

Typically, the load resulting from passengers or palletized or packaged cargo results in a rather distributed load and is carried by a modest floor structure. The floor structure consists, in part, of transverse floor beams that are connected to a monocoque skin of the fuselage through circumferential frames. Also included in the floor structure and lying on top of the transverse floor beams are longitudinal roller beams that take the cargo loading from the pallet through the rollers. Although the strength of a pallet does distribute concentrated loads, engineering design does not credit standard military pallets with this capability because their structural integrity is dependent upon their treatment or mistreatment in the field. Therefore the concentrated load of a heavy vehicle wheel is treated differently than that of packaged cargo resting on a pallet.

The freighter floor structure typically is composed of a plurality of shallow longitudinal roller tracks (roller beams with rollers installed) that are attached to the transverse floor beams and provide a structure upon which cargo pallets can slide for positioning in the aircraft. These roller beams also support the loaded pallets in their restrained positions and transfer loads to the underlying floor beams. The roller tracks run on opposite sides of the aircraft centerline. Typical military cargo pallets are comprised of aluminum skin laminated to a balsa wood core and have a thickness of approximately 2 to 4 inches and an area of approximately 109 by 200 inches. Seat track structure is typically positioned to accommodate passenger seat rows, and in these locations is used on freighters for cargo tie-down and attachment of cargo-handling components. The seat tracks are attached to the transverse floor beams.

Military cargo aircraft have stronger floor systems to support the high axle loads of military vehicles which may be transported. Static axle loads of 8,000 pounds are not uncommon. Furthermore, the aircraft may typically be subject to positive and negative vertical accelerations on the order of +2.5 gravities and −1.0 gravity, respectively. A substantial number of civilian cargo aircraft are therefore capable of performing only limited military cargo service as presently designed. The carriage of heavy vehicle, concentrated axle loads is the missing capability. It would be highly advantageous to increase use flexibility by temporarily converting these civilian cargo aircraft for heavy vehicle carriage when used for military service in a time of national emergency. Therefore, a need exists for a device which can temporarily increase the floor structure load capacity of a civilian cargo aircraft during use for military duty.

DISCLOSURE OF THE INVENTION

It is an object of the present invention to provide an apparatus which can temporarily convert a standard commercial cargo aircraft for military service by increasing its floor structure load rating.

It is also an object of the present invention to achieve the above object without requiring any permanent modification of the commercial cargo aircraft and without substantially altering the flex characteristic of the aircraft fuselage.

It is yet another object of the invention to achieve the above two objects with a device which can be easily inserted and removed from a conventional civilian cargo aircraft or a conventional civilian passenger aircraft.

Basically, the invention achieves these and other objects and advantages which will become apparent from the description which follows, by providing a removable elongated beam which distributes concentrated loads through several transverse floor beams of the aircraft fuselage. In the preferred embodiment, the beam includes a plurality of attachment mechanisms which are removably attachable to seat tracks in the aircraft floor structure.

The beam can be provided with substantially continuous top, bottom and side sheets which are interconnected by vertical transverse webs. The top, bottom and sides sheets and transverse webs are interconnected by vertical, longitudinal webs so that the beam has a box-like cross section. This structure resists substantial bending moments while being lightweight.

The beam can also be provided with laterally, downwardly tapered portions on the top to facilitate driving a vehicle over the beam.

BRIEF DESCRIPTION OF THE DRAWINGS

FIG. 1 is a cross-sectional view of a conventional civilian cargo aircraft fuselage with the removable strongback beam of the present invention connected to seat tracks on the aircraft floor.

FIG. 3 is a partial cross-sectional view taken along line 3—3 of FIG. 1.

FIG. 4 is an enlarged, partial, top plan view of a seat track with a fitting locked therein.

FIG. 5 is a partial cross-sectional view taken along line 5—5 of FIG. 4.

FIG. 7 is a top plan view of the removable aircraft floor structure-reinforcing strongback.

FIG. 8 is a schematic representation of a civilian cargo aircraft illustrating the positions of the removable aircraft floor structure-reinforcing strongback in the aircraft.

BEST MODE FOR CARRYING OUT THE INVENTION

Figure 6:
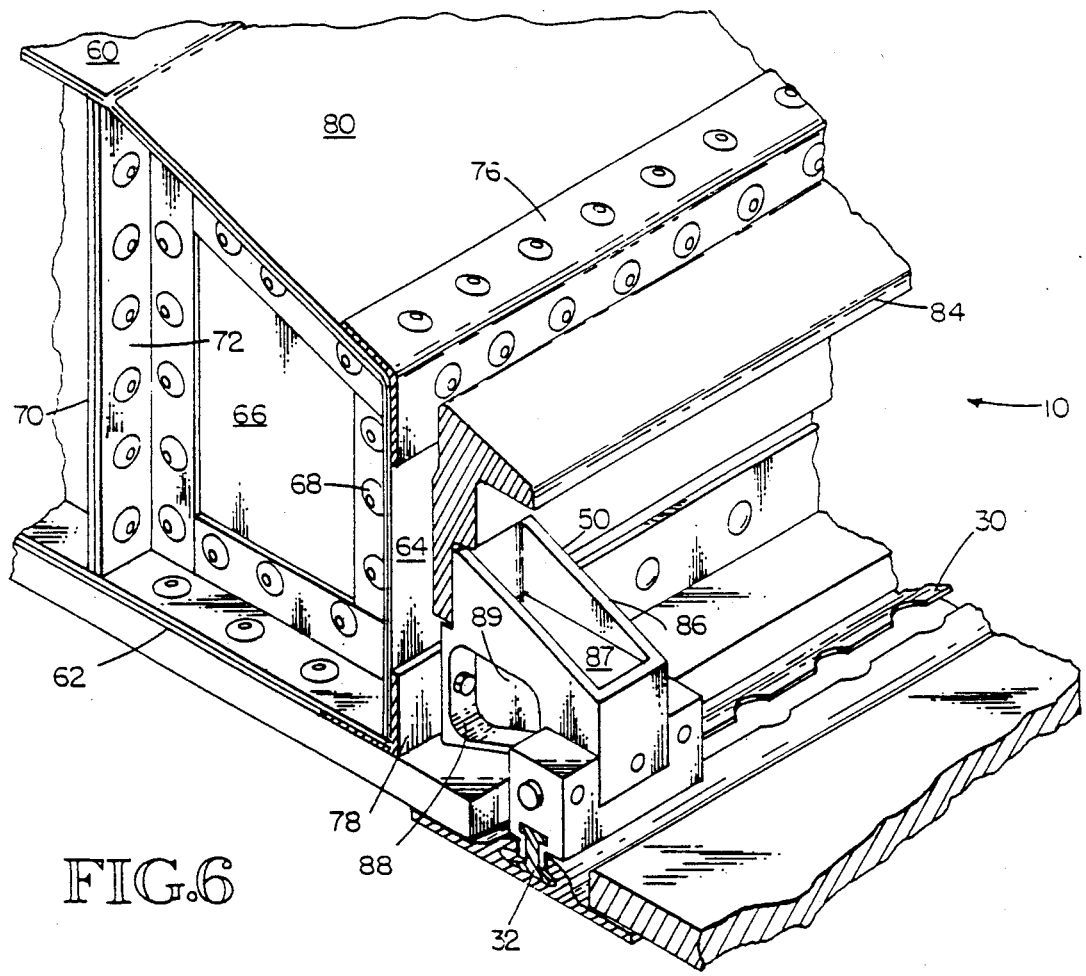
FIG. 6 is a partial isometric view of the removable aircraft floor structure-reinforcing strongback of the present invention.

A removable aircraft floor structure-reinforcing strongback, in accordance with the present invention, is generally indicated at reference, numeral 10 in FIG. 1. The strongback is shown installed in a conventional civilian cargo aircraft, generally indicated at reference 12, such as a Boeing model 747 cargo airplane. The aircraft has a fuselage skin 14 supported by circumferential frame members 16. Transverse floor beams 18 are connected to the circumferential frame member 16. The floor structure-reinforcing strongback distributes loads to the transverse floor beams 18 that are immediately underneath and/or fore and aft of a concentrated load. The influence of this distributing feature carries to more than just the beams that are immediately underneath, forward or aft of the concentrated load. The transverse floor beams exist everywhere throughout the fuselage except in the vicinity of the wing carry-through structure (not shown) and the main landing gear wheel wells (not shown), where floor beams run longitudinally. This strongback is proposed for use in the regions of the aircraft where transverse floor beams are present.

Figure 2:
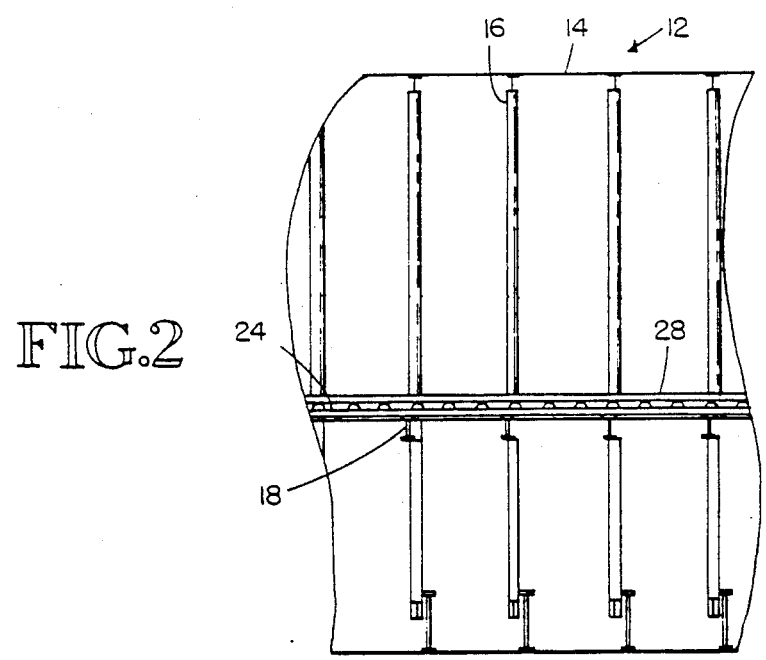
FIG. 2 is a partial cross-sectional view of the aircraft fuselage taken along line 2—2 of FIG. 1.

As shown in FIGS. 1, 2 and 3, the transverse floor beams 18 support three or more roller tracks 24 on opposite sides of an aircraft centerline 26. The roller tracks slidably receive cargo pallets 28 which support cargo in the fuselage.

The transverse floor beams 18 also support a plurality of laterally spaced seat tracks 30. The seat tracks removably receive passenger seats in single file. The beam straddles the centerline 26 of the fuselage by engaging the two most inboard tracks on either side of the centerline 26. Enlarged views of the most inboard seat tracks are shown in FIGS. 4 and 5. The seats, or other items to be attached to the floor tracks, have feet 32 which can be inserted in apertures 34 of the floor tracks. The feet can then be longitudinally translated to a portion of the track from which the feet cannot be vertically removed. Pins 36 restrain the feet intermediate the apertures 34 to securely restrain the seats. The tracks are attached to the transverse floor beams 18, such as by bolts (not shown).

The strongback 10, shown more fully in FIG. 6, is designed to be removably attached to the seat tracks 30 so that concentrated axle loads, such as from vehicles, are transferred throughout several of the transverse floor beams 18. In this way, the floor load rating of a conventional civil cargo aircraft is increased by approximately 12% to 16%. The beam has a box-like cross section which provides a substantial resistance to bending moments in a lightweight structure. The beam has fittings 50 located at regular intervals along the length of the beam to removably connect the beam to the seat tracks 30.

As best seen in FIGS. 6 and 7, the beam has substantially continuous top, bottom and side sheets 60, 62 and 64 which run the length of the beam. The sheets are connected at regular intervals by transverse webs 66. L-shaped angle brackets 68 are riveted to the transverse web and top, bottom and side sheets to interconnect them. Longitudinal webs 70 run between the transverse webs 66, and L-shaped angle brackets 72 are used to connect the longitudinal webs with the adjoining transverse webs and top and bottom sheets.

In the preferred beam 10, the side sheets 64 and longitudinal webs 70 are parallel to one another and are perpendicular to the top sheet 60, bottom sheet 62 and transverse web 66. The longitudinal web 70 has a height of approximately 7.5 inches, which gives the beam sufficient depth to provide a substantial increase in load-carrying capability to the aircraft lateral floor beams 18. The maximum limit on beam height is essentially the undercarriage clearance of the military vehicles which are expected to be loaded into the aircraft.

As previously stated, the pallets 28 shown in FIG. 1 have a thickness of approximately 2 inches. The sides 64 of the beam 10 are provided with a height of approximately 5 inches so that the pallet thickness in conjunction with the roller height is approximately equal to the height of sides 64. Tapered transitions 80 therefore exist between the sides 64 and longitudinal web 70 in the top sheet 60. As shown in FIG. 8, the cargo aircraft may be provided with a side door 82 in addition to or instead of a nose door. Thus, it may be desirable to drive a vehicle over the strongback 10 to fully utilize the interior floor space of the aircraft. The tapered transition provides a relatively smooth surface for driving a vehicle over the beam.

As is apparent from FIG. 6, the L-shaped brackets 68, 72 are internal to the strongback 10. The side sheets 64 are also preferably connected to the top and bottom sheets 60, 62 by external angle brackets 76, 78, respectively. The external angle brackets preferably run the length of the beam 10.

Each of the structural elements 60–78 of the beam is constructed from aluminum so that the beam has high strength and is lightweight. The fittings 50 are preferably constructed from high-strength steel.

The sides 64 also support steel longitudinal guide rails 84 which interact with rails typically provided on the pallet edges (not shown) to restrain the pallets during negative vertical accelerations of the aircraft. The fittings 50 are also provided with upper, angled edges 86 which do not contact the rails on the pallets so that pallet loads are not directly transferred to the fittings 50. The fittings are constructed in the "bathtub fashion" with cutouts 88 and web surfaces 89 to provide the necessary strength and reduce the weight thereof. The fittings are provided with feet 32 to engage the apertures 34 in the tracks 30.

FIG. 7 best illustrates the dimensions of the beam 10. As shown in the figure, the beam has an overall length of approximately 475 inches. The transverse webs 66 are provided at regular intervals of approximately 10 inches along the length of the beam. The beam has a width of approximately 23.4 inches and, as previously stated, a maximum depth of approximately 7.5 inches. The fittings 50 are connected through the sides 64 to L-shaped brackets 68 on alternating transverse webs 66. The transverse webs which do not have the fittings 50 are provided with cargo tie-down rings 100 which can be pivoted to a flush position with the top sheet 60.

As shown in FIG. 8, the preferred length of 475 inches is selected so that two identical strongbacks 10 can be positioned forward and aft of the wing box section 110 of a Boeing model 747 aircraft. A short strongback section 112, constructed in accordance with the principles of strongback sections 10, can be provided if heavy vehicles are to be loaded in the aft portion of the fuselage. Reinforcement of the aircraft floor in the vicinity of the wing box section 110 is not necessary because of additional reinforcing elements which are already present in the structure of the aircraft.

The invention will find particular utility in converting conventional civilian cargo aircraft of the Civil Reserve Air Fleet for military duty.

In view of the above, one of ordinary skill in the art can readily envision modifications of the invention which do not depart from the concepts described above. In particular, variation in dimensions of length and width may be accommodated according to seat track dimensions and fuselage lengths of various aircraft. Therefore, the invention is not be limited by the above description but is to be determined in scope by the claims which follow.

I claim:

1. A removable, longitudinal, floor structure-reinforcing beam for an aircraft of the type having longitudinal seat tracks on opposite sides of an aircraft centerline, comprising:
   a substantially continuous elongated beam having a predetermined length sufficient to overlay a substantial plurality of transverse floor beams in the aircraft floor, and also having a width sufficient to substantially span the distance between two adjacent seat tracks in the aircraft floor and a substantial depth sufficient to increase an axle load rating of the aircraft floor structure at least 12%–16%; wherein the depth and width of the beam are insufficient to prevent a conventional, wheeled military vehicle from passing thereover.
   attachment means spaced at regular intervals along the beam length for removably attaching the beam to seat tracks on an aircraft floor.

2. The beam of claim 1 wherein the beam has a depth of approximately eight inches.

3. The beam of claim 1 for use with cargo aircraft of the type having a plurality of longitudinal roller tracks for supporting cargo pallets on opposite sides of the aircraft centerline, the beam also having a laterally downwardly tapered top to facilitate movement of wheeled vehicles over the beam and across the aircraft centerline.

4. The beam of claim 1, including longitudinally extending, substantially continuous top, bottom and side sheets, vertical transverse webs connected between the top, bottom and side sheets at regular intervals along the length of the beam, and vertical longitudinal webs connected between the top and bottom sheets and between adjacent vertical transverse webs so as to form a beam having a box cross section.

5. The beam of claim 4 wherein the regular intervals at which the vertical transverse webs are spaced is approximately ten inches.

6. The beam of claim 4 wherein the top, bottom and side sheets and transverse and longitudinal webs are made of aluminum.

7. The beam of claim 4 wherein the attachment means are connected to the side sheets.

8. The beam of claim 7 wherein the attachment means include fitting pairs longitudinally located adjacent to every other transverse web.

9. The beam of claim 8, including tie-downs located on top of the beam and longitudinally located adjacent to each transverse web which is not adjacent to a fitting pair.

10. The beam of claim 1 wherein the regular intervals at which the attachment means are spaced is approximately twenty inches.

11. The beam of claim 1, including longitudinal guide rails on each side to restrain vertical movement of cargo pallets.

12. The beam of claim 1, including a plurality of cargo tie-downs longitudinally located at regular intervals.

13. The beam of claim 12 wherein the regular intervals at which the cargo tie-downs are located is approximately twenty inches.

14. The beam of claim 1 wherein the beam has a width of approximately twenty-three inches.

15. The beam of claim 1 wherein the beam has a length of approximately 475 inches.

16. A method of increasing the axle load rating of the floor structure of an aircraft and for loading military vehicles into the load enhanced aircraft, comprising the steps of:
   positioning an elongated, removable load distributing beam along a centerline of an aircraft on a floor of the aircraft;
   temporarily connecting the beam to transverse frame members of the aircraft floor structure by connecting the beam to seat tracks on the aircraft floor structure; and
   driving a military vehicle onto the aircraft floor and over the beam.

* * * * *